United States Patent
Kriett et al.

(10) Patent No.: US 12,111,162 B1
(45) Date of Patent: Oct. 8, 2024

(54) TECHNIQUES FOR REACTIVE ROUTE PLANNING

(71) Applicant: Amazon Technologies, Inc., Seattle, WA (US)

(72) Inventors: Phillip Oliver Kriett, Lynnwood, WA (US); Quico Pepijn Spaen, Menlo Park, CA (US); Georgios Patsakis, Sunnyvale, CA (US); Diwakar Tiwari, Newcastle, WA (US); Akhand Pratap Singh, Seattle, WA (US); Ivan Borges Oliveira, Bellevue, WA (US); Andrew V. Goldberg, Emerald Hills, CA (US); Philip Mark Kaminsky, El Cerrito, CA (US); Karthik Ramakrishnan, Issaquah, WA (US); Manik Kumar, Woodinville, WA (US)

(73) Assignee: Amazon Technologies, Inc., Seattle, WA (US)

( * ) Notice: Subject to any disclaimer, the term of this patent is extended or adjusted under 35 U.S.C. 154(b) by 274 days.

(21) Appl. No.: 17/845,439

(22) Filed: Jun. 21, 2022

(51) Int. Cl.
G01C 21/34 (2006.01)

(52) U.S. Cl.
CPC ..... *G01C 21/3415* (2013.01); *G01C 21/3446* (2013.01)

(58) Field of Classification Search
CPC ................ G01C 21/3415; G01C 21/3446
See application file for complete search history.

(56) References Cited

U.S. PATENT DOCUMENTS

| | | | |
|---|---|---|---|
| 8,571,915 B1 | 10/2013 | Wong et al. | |
| 10,679,311 B2 | 6/2020 | Mohr et al. | |
| 2003/0167109 A1 | 9/2003 | Clarke et al. | |
| 2011/0208416 A1* | 8/2011 | Speier ............... | G01C 21/3461 |
| | | | 701/532 |
| 2015/0317653 A1 | 11/2015 | Ettl et al. | |

(Continued)

OTHER PUBLICATIONS

Euchi, "The Vehicle Routing Problem With Private Fleet and Multiple Common Carriers: Solution With Hybrid Metaheuristic Algorithm," Vehicular Communications, vol. 9, 2017, pp. 97-108.

(Continued)

*Primary Examiner* — Seth A Silverman
(74) *Attorney, Agent, or Firm* — Kilpatrick Townsend & Stockton LLP

(57) ABSTRACT

One challenge for middle-mile route planning is that the set of loads changes significantly between daily planning and execution. Systems and methods are provided for optimizing a transportation plan for a transportation network based on these load changes. The disclosed system re-optimizes a solution by starting from a previously existing plan and previously generated columns (e.g., candidate routes). The disclosed techniques significantly improve the compute time of the system to generate transportation plans that are optimized accordingly to an optimization parameter. The system takes into account the current execution status associated with a given entry of the plan to determine whether the entry should be re-optimized. Entries corresponding to tours that have already commenced, may be at least partially ignored for re-optimization consideration. The disclosed techniques enable state-aware, adaptive re-optimization for even tours that are in-progress or have been tendered.

20 Claims, 9 Drawing Sheets

(56) References Cited

U.S. PATENT DOCUMENTS

| | | |
|---|---|---|
| 2017/0046658 A1 | 2/2017 | Jones et al. |
| 2017/0352003 A1 | 12/2017 | Bertoli et al. |
| 2018/0211201 A1 | 7/2018 | Nayak et al. |
| 2018/0349849 A1 | 12/2018 | Jones et al. |
| 2022/0067616 A1* | 3/2022 | Villa ................. G06Q 30/0284 |
| 2022/0108235 A1* | 4/2022 | Schulz ................. G06Q 10/025 |
| 2022/0113147 A1* | 4/2022 | Brocato ............. G01C 21/3492 |
| 2023/0290249 A1* | 9/2023 | Hunt ................. G01C 21/3453 |

OTHER PUBLICATIONS

Kriett et al., U.S. Appl. No. 17/331,272, filed May 26, 2021, Titled: Resource Planning Using Block and Route Information, 34 pages.

\* cited by examiner

CANDIDATE COLUMN
POOL
300

| COLUMN ID | ASSOCIATED LEGS | | | BLOCK |
|---|---|---|---|---|
| COLUMN 254 | LEG 7<br>ORIGIN / DESTINATION<br>START TIME / END TIME<br>LOADED / EMPTY<br>STATE: LOCKED | LEG 3<br>ORIGIN / DESTINATION<br>START TIME / END TIME<br>LOADED / EMPTY<br>STATE: PLANNABLE | LEG 4<br>ORIGIN / DESTINATION<br>START TIME / END TIME<br>LOADED / EMPTY<br>STATE: PLANNABLE | B1 |
| COLUMN 213 | LEG 5<br>ORIGIN / DESTINATION<br>START TIME / END TIME<br>LOADED / EMPTY<br>STATE: LOCKED | LEG 6<br>ORIGIN / DESTINATION<br>START TIME / END TIME<br>LOADED / EMPTY<br>STATE: PLANNABLE | | B1 |
| COLUMN 444 | LEG 7<br>ORIGIN / DESTINATION<br>START TIME / END TIME<br>LOADED / EMPTY<br>STATE: LOCKED | LEG 8<br>ORIGIN / DESTINATION<br>START TIME / END TIME<br>LOADED / EMPTY<br>STATE: CANCELED | LEG 9<br>ORIGIN / DESTINATION<br>START TIME / END TIME<br>LOADED / EMPTY<br>STATE: PLANNABLE | B1 |
| COLUMN 609 | LEG 10<br>ORIGIN / DESTINATION<br>START TIME / END TIME<br>LOADED / EMPTY<br>STATE: LOCKED | LEG 11<br>ORIGIN / DESTINATION<br>START TIME / END TIME<br>LOADED / EMPTY<br>STATE: LOCKED | | B8 |

FIG. 3

ROUTE PLAN
400

| COLUMN ID | ASSOC. LEGS | BLOCK ID | START TIME | START LOCATION | BLOCK STATE | LOADED DRIVE TIME |
|---|---|---|---|---|---|---|
| COLUMN 123 | 16, 18, 20 | B5 | 3/23/23 4:15P | SEATTLE | PLANNABLE | 6.25 |
| COLUMN 947 | 15, 17, 23 | B4 | 3/18/23 2:00P | PORTLAND | PLANNABLE | 4.4 |
| COLUMN 878 | 54, 82 | B78 | 3/17/23 8:00P | SEATTLE | PLANNABLE | 4.6 |
| COLUMN 116 | 84, 98, 75 | B12 | 3/17/23 8:00A | WICHITA | PLANNABLE | 8 |
| COLUMN 444 | 7, 8, 9 | B1 | 3/17/23 8:00A | SEATTLE | PLANNABLE | 12 |
| COLUMN 609 | 10, 11 | B8 | 3/17/23 8:00A | HOUSTON | PLANNABLE | 6.7 |

402

404

| COLUMN 444 | LEG 7<br>ORIGIN / DESTINATION<br>START TIME / LOCATION<br>LOAD / EMPTY<br>STATE: LOCKED | LEG 8<br>ORIGIN / DESTINATION<br>START TIME / LOCATION<br>LOAD / EMPTY<br>STATE: CANCELLED | LEG 9<br>ORIGIN / DESTINATION<br>START TIME / LOCATION<br>LOAD / EMPTY<br>STATE: PLANNABLE |
|---|---|---|---|

FIG. 4

UPDATED
CANDIDATE COLUMN
POOL
700

| COLUMN ID | ASSOCIATED LEGS | | | BLOCK |
|---|---|---|---|---|
| COLUMN 254 | LEG 7<br>ORIGIN / DESTINATION<br>START TIME / END TIME<br>LOADED /EMPTY<br>STATE: LOCKED | LEG 3<br>ORIGIN / DESTINATION<br>START TIME / END TIME<br>LOADED /EMPTY<br>STATE: PLANNABLE | LEG 4<br>ORIGIN / DESTINATION<br>START TIME / END TIME<br>LOADED /EMPTY<br>STATE: PLANNABLE | B1 |
| COLUMN 213 | LEG 5<br>ORIGIN / DESTINATION<br>START TIME / END TIME<br>LOADED /EMPTY<br>STATE: LOCKED | LEG 6<br>ORIGIN / DESTINATION<br>START TIME / END TIME<br>LOADED /EMPTY<br>STATE: PLANNABLE | | B1 |
| COLUMN 444 | LEG 7<br>ORIGIN / DESTINATION<br>START TIME / END TIME<br>LOADED /EMPTY<br>STATE: LOCKED | LEG 8<br>ORIGIN / DESTINATION<br>START TIME / END TIME<br>LOADED /EMPTY<br>STATE: CANCELED | LEG 9<br>ORIGIN / DESTINATION<br>START TIME / END TIME<br>LOADED /EMPTY<br>STATE: PLANNABLE | B1 |
| COLUMN 909 | LEG 10<br>ORIGIN / DESTINATION<br>START TIME / END TIME<br>LOADED /EMPTY<br>STATE: LOCKED | LEG 11<br>ORIGIN / DESTINATION<br>START TIME / END TIME<br>LOADED /EMPTY<br>STATE: LOCKED | | 99 |

TECHNIQUES FOR REACTIVE ROUTE PLANNING

BACKGROUND

More and more users and entities are turning to online services for day-to-day activities. Many of the services span both the digital world and the physical world. For example, a user may operate a computing device to order an item from a web site. The item may be delivered from a storage facility to a delivery location of the user.

Generally, the delivery of the item may involve multiple physical locations in between the storage facility and the delivery destination. A delivery system may include the in between, physical locations. For example, the item may be delivered from the storage facility to a delivery hub. The delivery hub may also receive items from a number of storage facilities. The items may be sorted for deliveries to respective delivery stations, loaded onto delivery vehicles, and sent forward to the delivery stations. This leg of the delivery may be referred to as "the middle mile."

Route planning is a computationally expensive and time-consuming process. Route planning for the middle mile can be challenging due to real-time changes that occur. For example, upstream scheduling services may cancel or add deliveries between physical locations after a plan for routing those deliveries has been generated. These ad-hoc additions and cancellations may reduce the efficiency of the current plan leading to suboptimal allocation and use of routing resources.

BRIEF DESCRIPTION OF THE DRAWINGS

Various embodiments in accordance with the present disclosure will be described with reference to the drawings, in which:

FIG. 3 illustrates an example candidate column pool, according to at least one embodiment of the present disclosure;

FIG. 4 illustrates an example route plan, according to at least one embodiment of the present disclosure;

FIG. 7 illustrates an example updated candidate column pool, according to at least one embodiment of the present disclosure;

DETAILED DESCRIPTION

Figure 1:
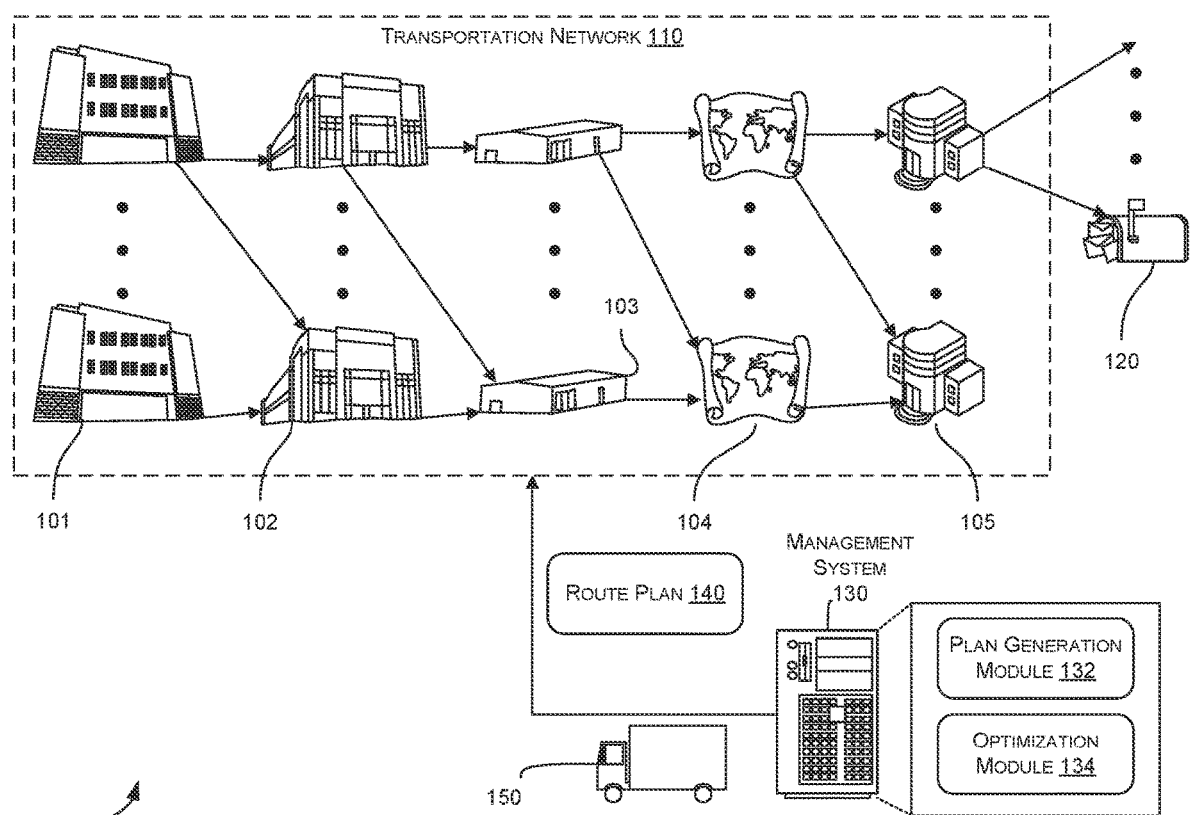
FIG. 1 illustrates an example environment for delivering items to end destinations, according to at least one embodiment of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, optimizing a transportation plan (also referred to herein as a "route plan" or a "resource plan") associated with transporting items between physical locations (also referred to as "nodes") of a transportation network. The item may be received and routed through various physical locations within the delivery path (also referred to as a "route") prior to reaching the delivery destination. The computing system may obtain various data with which an initial route plan may be generated. By way of example, the computing system may obtain metadata associated with a set of loads. A "load" may refer to an empty or loaded container or set of items that is to be moved from one node to another within the transportation network. A "leg" refers to a task associated with moving a delivery resource (e.g., a transportation vehicle) from one node to another within the transportation network. Some legs are associated with moving a load from one node to another. A leg and/or load may be associated with a source node (e.g., an origin at which the load is initially located), a destination node (e.g., a physical location to which the load is to be delivered), and a time window (e.g., a time window during which transportation of the load is to be performed, a time window during which the leg is to be executed). The computing system may obtain metadata associated with a number of blocks. A "block" refers to a predefined time period during which a transportation resource (e.g., a driver, a transportation vehicle, etc.) is available to transport loads. During an initial planning stage, the computing system may utilize an optimization model (e.g., a column generation algorithm) to generate a number of columns. A "column" refers to a candidate tour, or in other words, a sequence of one or more legs to be potentially assigned to a particular block (e.g., driver shift). The optimization model may be configured to generate any suitable number of candidate columns for each known block. Utilizing a set of constraints (e.g., cost constraints, driver constraints, timing constraints, handling constraints associated with various nodes in the network, etc.) the computing system may be configured to select a column for each block from among the candidate columns to generate an initial route plan. This initial route plan can be optimal with respect to the data and constraints known at the time of selection. As a non-limiting example, the initial route plan can be optimal with respect to minimizing transportation costs and/or maximizing resource utilization (e.g., total drive time of each driver, etc.). In some embodiments, the system may tender (e.g., transmit instructions) to various transportation providers. Some transportation providers may be associated with a common entity that operates and/or is associated with the computing system. In some cases, third-party providers associated with different entities from the one operating the computing system.

At any suitable time, any suitable number of legs may be added or canceled. By way of example, upstream services may add new loads/legs while other previously planned legs may be canceled or otherwise modified (e.g., rescheduled). In light of these changes, the efficiency or other advantages of the initial route plan may be reduced. The initial plan generation process can be time intensive and computational expensive. For example, in a system with approximately 400,000 loads, performing the iterative process to generate the initial route plan can take 4-7 hours. Additionally, the initial plan generation process may not be configured to consider whether instructions have already been sent to effectuate transportation of a load or whether transportation of a load is already being performed (or will be in the relatively near future).

Embodiments of the present disclosure provide various technological advantages over a conventional computing system that generates a transportation plan for items in a transportation network. The disclosed system and methods reduce the overall compute time to generate an optimal route plan. Rather than starting from a blank slate in which the set of loads and blocks are used to generate a candidate column pool from which particular columns are selected for the initial route plan as in previous systems, the disclosed computing system may utilize the previously computed route plan and previously identified candidate column pool to reoptimize the route plan. The disclosed computing system can adapt and repair the column pool and/or initial plan to reflect changes caused by ad-hoc loads (e.g., newly added loads), canceled loads, changes in the tendering (e.g., indicating whether instructions have been sent to the transportation provider to effectuate the execution of a leg and/or tour) or current execution status of a leg and/or tour. These techniques enable an optimal route plan to be computed in substantially less time (e.g., two hours instead of four to seven hours, etc.) and enable the system to utilize current tendering/execution status in order to reduce the computational complexity of the re-optimization operations, while simultaneously enabling re-optimization at a finer degree of granularity (e.g., a portion of a column) than previously existed in conventional systems.

Utilizing the disclosed techniques may enable the transportation system to reoptimize its route plan throughout the day as changes occur. This is in direct contrast to conventional systems that, due to the computational burden of generating an optimized route plan, performed such computations less frequently (e.g., once a day, once a week, etc.). Absent the embodied techniques, finding the optimal solution to timely support execution of a route plan in light of real-time changes may be computationally infeasible. In another example, many systems may subscribe to the output of the disclosed system. Operations of these systems may also be improved. For instance, a management system may plan the delivery-vehicle deployment and usage in an optimized manner. Similarly, an inventory management system may plan for receiving and storing items in an optimized manner. In yet a further example, the synergetic use of the digital data to manage operations in the physical world may improve such operations. For instance, the physical deployment and usage of a vehicle may be optimized. This may become crucial in various situations. For instance, there may be a situation where some or all of the deployed vehicles may be unmanned vehicles. Such vehicles may autonomously perform certain operations associated with transporting items. In these situations, an optimal plan may become paramount to properly manage the physical deployment and usage of the unmanned vehicles.

FIG. 1 illustrates an example environment 100 for delivery items to end destinations. The environment may include a transportation network 110. Specifically, a load (e.g., corresponding to a set of items) may be transported between nodes of the transportation network 110 as part of a process for ultimately delivering items to various delivery locations (e.g., delivery location 120 corresponding to a consumer's address). The loads may originate from source nodes and be delivered to destination nodes. A source node is a physical location within the transportation network 110 from which a delivery of an item can be sourced or start. A destination node is a physical location within the transportation network 110 at which a load may be delivered. A management system 130 may be configured to dynamically generate a route plan 140 based on information related to the volume of items and/or the capacity and desired throughput of the transportation network 110.

As illustrated, the transportation network 110 may include any suitable number nodes (e.g., nodes 101-105). Each node may represent a location where an item may be received, processed, and prepared for delivery to a next node or to a final delivery location (e.g., delivery location 120). Handling the item may generally refer to any of receiving, processing, and/or delivery preparation and may be performed using one or more handling systems. A handling system may include a computer system, operator devices (e.g., handheld devices), and/or material handling equipment configured to perform delivery-related actions on an item, such as scanning identifiers (e.g., barcodes), printing and attaching identifiers, sorting, cross-docking, moving, packing, unpacking, stowing, picking, or performing other deliver-related actions.

At least some of the nodes may be managed by a particular entity, such as a service provider. Other nodes may be managed by different entities. FIG. 1 illustrates a number of nodes including a fulfillment center, a sortation center, and a delivery station. Specifically, a fulfillment center 101 may store items to fulfill customer orders for the items. The transportation network 110 may forwardly connect the fulfillment center 101 to sortation centers 102 and other fulfillment centers 101, among other nodes. A sortation center 102 may receive multiple items from one or more fulfillment centers 101 and other nodes and may sort or cross-dock the items into more refined geographic delivery regions. Sorting items involves separating items into different subsets, in which each subset is to be transported to a different handling node or destination node. The transportation network 110 may forwardly connect the sortation center 102 to delivery stations 103 and other sortation centers 102, among other nodes. A delivery station 103 may receive multiple items from one or more sortation centers 102 and other nodes and more refined sorting may occur to prepare for deliveries to specific delivery zones 104. Each delivery zone 104 may represent a geographic area of certain resolution (e.g., corresponding to a certain predefined volume of deliveries or destination locations) and may represent a delivery location having that geographical resolution. Within each zone, multiple housing complexes 105 may exist. Each housing complex 105 may house multiple delivery locations 120 and may represent a destination node responsible for these delivery locations 120.

Each of the nodes may be associated with an inventory management system. Additionally or alternatively, the different nodes of the transportation network 110 may be associated with an inventory management system. Regardless, the inventory management system may be a computer system in communication with the management system 130 and the handling system(s) over one or more data networks. The inventory management system may track the locations of items, update item records and inventory records, and/or may generate tasks to handle items. In an example, the management system 130 may send a route plan 140 to the inventory management system of the transportation network 110. In turn, the inventory management system may distribute the route plan 140 to the appropriate handling systems (e.g., systems associated with receipt, processing, and/or transportation of the items/loads) and may, additionally or alternatively, generate and distribute tasks and/or instructions based on the route plan 140 and related information to the appropriate handling systems. The distribution of the route plan and/or tasks/instructions is generally referred to herein as "tendering." Accordingly, an item destined to a delivery location 120 may travel along a delivery path through the transportation network 110. The delivery path (also referred to as a "route") may include a sequence of one or more nodes within the transportation network 110. The sequence may represent a particular order of traveling between the applicable nodes.

Demand for items that need to be transported between a source node and destination node of the transportation network 110 can be forecasted. The management system 130 may represent a computer system, such as a server, a cloud computing service, or a back-end system, configured to generate a route plan 140. Generally, the route plan 140 may depend on improving an optimization parameter of the transportation network 110. The management system 130 can include a plan generation module 132 that is configured to generate, from a number of predefined loads and a number of predefined blocks, a number of candidate columns that identify a potentially pairing of one or more loads to a given block. The plan generation module 132 may then generate route plan 140 from the candidate columns according to a variety of optimization dimensions. Example dimensions may include amount of utilized capacity, achieved throughput, computational burden (e.g., processing and memory utilization associated with sensing, scanning, instructing, and performing other handling-related actions), cost savings (e.g., cost of transportation, manpower, number of touches), volume of items per transportation vehicle, number and/or type of transportation vehicles, and other efficiency-related considerations.

The plan generation module 132 may utilize an optimization model (e.g., an objective function) that utilizes as input a forecasted demand for transporting various loads between corresponding source nodes and a destination nodes of the transportation network 110 and a set of constraints (e.g., constraints associated with a node of the transportation network 110, a set of costs associated with transportation of the items, etc.) to generate the route plan 140. The costs may be costs associated with a transportation method (e.g., airplane, truck or any other transportation type), costs associated with using a certain transportation vehicle capacity (e.g., the volume of items per transportation vehicle), costs associated with a type of item handling, or costs associated with any other aspects of transporting items from the source node to the destination node. The source node can be any location in the transportation network that is a previous location for the load than the destination node. The destination node can be a location at which a load can be delivered that occurs before the delivery location 120. The optimization model utilized by the generation module 132 may generate an optimized plan (e.g., route plan 140) in two stages. For example, a first stage can include identifying a number of possible columns (e.g., sequences of legs representing movement of loads or empty containers between respective nodes) for each known block (e.g., a driver shift associated with a driver of the transportation resource (e.g., vehicle 150) to be utilized to perform the planned movements). The second stage can include selecting an optimal combination of columns (e.g., the route plan 140) in which a single column is selected for each block from among the potential columns generated for each block. The selection/identification of the optimal combination of columns can be optimized based at least in part on any suitable combination of the constraints/costs discussed above with respect to any suitable number of optimization parameters (e.g., to calculate a lowest overall cost, to maximize overall total drive time amongst the drivers, etc.).

The management system 130 may include optimization module 134. Optimization module 134 may be configured to obtain a previously generated route plan (e.g., route plan 140, previously generated by the plan generation module 132)) and a previously generated column pool (e.g., a column pool generated by the plan generation module 132). In some embodiments, optimization module 134 may be configured to adapt and/or repair the column pool and/or the route plan 140 by removing canceled loads/legs from the column pool and route plan 140. The optimization module 134 may obtain a set of newly added loads. Additional loads available for replanning may be identified from the column pool based at least in part on identifying a tendering and/or execution status corresponding to the loads/legs included in each column of the column pool and/or route plan 140. In some embodiments, legs that are scheduled to commence within a threshold time window (e.g., the next two hours, four hours, etc.) may be considered locked and unavailable for replan/re-optimization. The optimization module 134 may be configured to reoptimize the route plan 140 based at least in part on the newly added loads (referred to herein as "ad-hocs") and the canceled loads. By utilizing the tendering and/or execution status, the optimization module 134 can identify portions of previously selected columns that may be re-optimized despite at least some of the column being in-progress or otherwise unchangeable.

Figure 5:
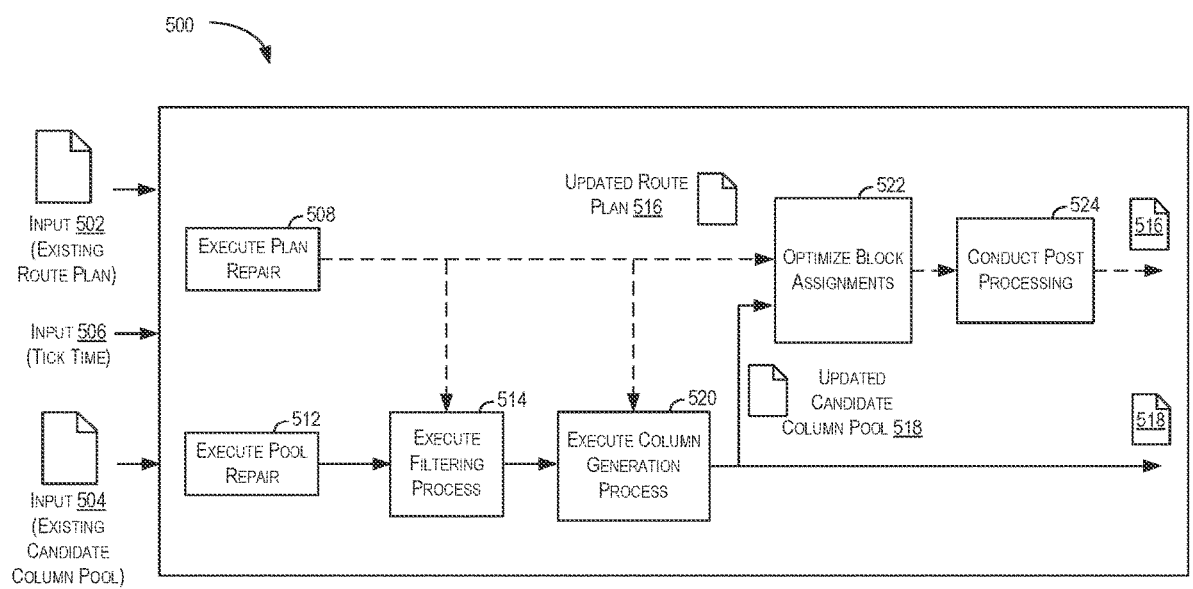
FIG. 5 illustrates a block diagram and flow illustrating operations performed by an optimization module, according to at least one embodiment of the present disclosure

The optimization module 134 can continuously improve its solution (e.g., a reoptimized version of the route plan 140) across planning sessions by resuming from the end state of the previous route planning session. The optimization module 134 may maintain consistency in the route plan 140 by warm-starting from an existing route plan and changing only what is needed (e.g., according to a predefined set of rules) to improve the solution. This reduces the computational complexity and overall compute time to identify a newly optimized solution over the complexity and time required for performing the optimization provided by the plan generation module 132. FIG. 5 discusses in more detail the features of the optimizations performed by optimization module 134.

In some embodiments, management system 130 of FIG. 1 may be configured to tender (e.g., transmit) tour instructions (e.g., column assignment including leg metadata) to a selected transportation provider at a predefined time before the start time of the column, according to a predefined schedule, or the like. As a non-limiting example, management system 130 may be configured to tender a tour (metadata corresponding to the column and/or block) to a transportation provider 12 hours before the start time of the tour. Upon tendering the tour to the transportation provider, or upon reaching a tender time (e.g., a predefined period of time (e.g., 12 hours, 15 hours, etc.) before the start time of the tour, the start time of the first leg of the tour, the start time of the block associated with the tour, etc.), the management system 130 may modify the block state to "tendered plannable" to indicate the tour was tendered or the tender time was reached, but the column is still changeable to some extent, so long as the changes are made in accordance with a predefined set of restrictions. As time passes, the management system 130 may be configured to incrementally update leg status for legs of in-progress tours. For example, the management system 130 may track a current time, when the current time reaches a predefined threshold time, such as two hours before start of a given leg, the management system 130 may be configured to update a status of the given leg to "locked."

In some embodiments, when the start time of the block or first leg of the tour associated with that block is reached, or a threshold time period before the start time of the block or first leg is reached (e.g., a time referred to as a "tick time"), the management system 130 may be configured to modify the block state to "in-progress" to indicate execution of transporting the loads associated with the block are in progress. In some embodiments, the "in-progress" block state may be associated with a different set of restraints then the ones used to determine whether legs are modifiable when the block state is set to "tendered—plannable."

In some embodiments, the management system 130 may track or otherwise ascertain the status of legs and/or loads as described above and may update the leg status and/or block status accordingly.

Figure 2:
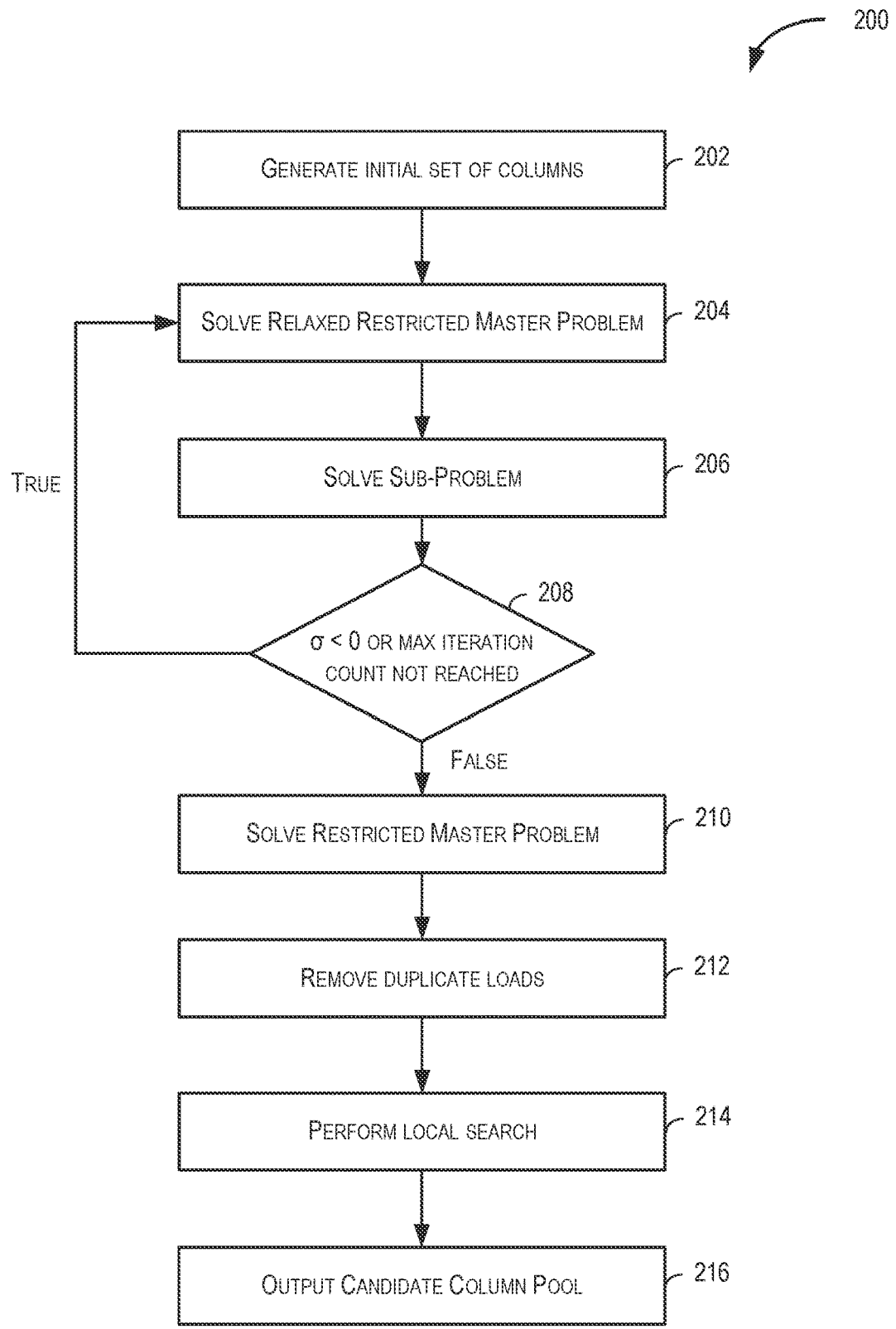
FIG. 2 illustrates a flow for an example column generation algorithm configured to generate a candidate column pool, according to at least one embodiment of the present disclosure.

FIG. 2 illustrates a flow for an example method 200 for generating a candidate column pool, according to at least one embodiment of the present disclosure. In some embodiments, the plan generation module 132 of FIG. 1 may be configured to execute the operations discussed in connection with FIG. 2. Method 200 may be referred to herein as a "column generation algorithm."

In some embodiments, resource availability (e.g., driver availability) is modeled by blocks (e.g., a data structure), which identify the earliest start time of a tour, the latest end of a tour, and feasible tour start and end locations. The terms "tour" and "column" can be used synonymously to refer to a sequence of legs (e.g., movements of empty or non-empty loads from one node to another in a transportation network). Demand may be modeled by loads (e.g., additional data structures), and can exceed what can be served by the given blocks. The opportunity cost of every load (e.g., the price that would have to be paid if the load would be fulfilled by a third-party transportation provider) may be assumed to be known. A column may be considered to be a feasible if it satisfies intra-route constraints, including, but not limited to: planning assumptions, such as time requirements for transit, hooking, and dropping a trailer; scheduling decisions, such as pick-up and delivery windows; and regulations and laws, such as bounds defined for drive time, duty time, and rest time. A set of feasible columns (e.g., a candidate column pool) may be determined using the operations of method 200. An subset of columns may be identified as a route plan. The subset of columns may be identified based at least in part on maximizing the total value of the set of served loads, or, by duality, that minimizes the value of the set of loads that have to be fulfilled externally (e.g., by one or more third-party transportation providers).

FIG. 2 depicts a column generation algorithm that includes an iterative process and decomposition technique, which can be applied to solve linear programming problems that involve a relatively large number of variables. In this context, a linear program (e.g., identifying an optimized route plan) may be referred to as the "Master Problem" (MP). The idea behind the decomposition is to treat any linking structure at the coordinating master level and to address the sub-problems independently at a subordinate level, exploiting their special structure algorithmically. In every iteration, a Restricted Master Problem (RMP) and a subproblem or pricing problem, may be solved sequentially. In some embodiments, the RMP is the MP restricted to a subset of its variables. It may be solved to provide a primal and a dual solution. Given this dual solution, the subproblem may include identifying negative reduced cost columns for the RMP if some exist. If such columns are found, they are added to the RMP before starting a new iteration. If no negative reduced cost columns can be found, the solution process stops and the current RMP primal solution is declared optimal for the MP. In order to limit runtime, the iterative loop may be broken after a small number of iterations.

The MP may be modeled as a maximum coverage problem with group budget constraints which is to maximize the total value of the set of loads that are covered by at least one column such that at most one column is assigned to every block. An example MP is provided below.

Sets
  B=a set of blocks.
  I=a set of loads.
  $R_b$=a set of routes that have been generated for block $b \in B$.
  $R_{b,i}$=a set of routes that have been generated for block $b \in B$ and that cover loads I.

Parameter
  $C_{r,b}$=Cost of route $r \in R_b$ for block $b \in B$.

Decision Variable
  $x_{r,b}=1$ if route $r \in R_b$, which has been generated for block $b \in B$, is selected and 0 otherwise.

$$\min \sum_{b \in B} \sum_{r \in R_b} C_{r,b} x_{r,b} \quad (1)$$

$$\sum_{b \in B} \sum_{r \in R_b} x_{r,b} \geq 1 \quad (2)$$

$$\forall i \in I$$

$$\sum_{r \in R_b} x_{r,b} \geq 1 \quad (3)$$

$$\forall b \in B$$

$$x_{r,b} \in \{0, 1\} \quad (4)$$

$$\forall b \in B$$

$$\forall r \in R_b$$

Every column in this integer programming (IP) formulation may model a router that has been generated for a particular block b. Every column has a cost $C_{r,b}$ associated, which is calculated by subtracting the value ($V_i$) of the covered transportation requests ($I_{r,b}$) from the block cost. The block cost is given by a sufficiently large, uniform hourly rate HR multiplied with the maximum number of drive hours this block can produce:

$$C_{r,b} := \text{maximum drive hours of block } b \times HR - \sum_{i \in I_{r,b}} V_i \quad (5)$$

HR may be chosen so that $C_{r,b} > 0$ holds for all $b \in B$ and $r \in R_b$. This cost model ensures that columns that add more value to the business are less expensive and the objective becomes to find the minimum-cost cover. More precisely, the problem is to cover every transportation request (2) such that the total cost is minimized (1) and such that at most one tour is assigned per block (3). In order to ensure feasibility, a dummy column is added for every transportation request i. It models a route that has been generated for the most-costly type of block and that covers only transportation request i.

Method 200 may begin at 202, where an initial set of columns may be generated. In some embodiments, the transportation network 110 of FIG. 1 may be modeled as a directed graph G, with any suitable number of nodes N and arcs E (not depicted). The operations performed at 202 may include generating a set of columns that is rich enough so that the objective function value of the optimal RMP solution is close to the optimal MP solution (which is unknown). In some embodiments, a computing module (e.g., the plan generation module 132 of FIG. 1) may obtain a number of predefined blocks. For each block (e.g., a data structure storing metadata corresponding to a time period associated with resource availability and a set of constraints), the computing module may distributes a computational workload for identifying a column for the block to a computing thread. Thus, in some embodiments, the computing module may effectuate parallel processing for identifying a number of columns for each block. In some embodiments, the computing module (e.g., the threads initiated by the computing module) attempts to generate a column set that replicates the structure of an optimal integer solution by iteratively generating load-disjoint columns in a greedy fashion. In every iteration, the least expensive load-disjoint paths may be collected and both uncovered loads (loads that have not been assigned to a block) and unused blocks (blocks that have not been assigned a load) are carried over to the next iteration. The operations at 202 may be performed any suitable number of times (e.g., five, ten, etc.) to generate any suitable number of potential candidate columns for each block.

At 204, a Relaxed Restricted Master Problem (RRMP) may be solved. The formulation of the RRMP may differ from the MP discussed above with respect to constraint (4). In some embodiments, for the RRMP, the constraint (4) is relaxed and replaced with:

$$x_{r,b} \in 0 \qquad (5)$$
$$\forall b \in B$$
$$\forall r \in R_b$$

In some embodiments, the linear programming solution of the RRMP provides the dual values $\pi_i \geq 0$ and $\lambda_b \leq 0$, which can be associated to the loads I in constraints (2) and the blocks B in (3).

At 206, operations may be performed to solve a subproblem. The subproblem may include computing the minimum-cost route for a given block and may be modeled as a resource constrained elementary shortest path problem (RCESPP). A path may be considered feasible if it satisfies resource constraints, path-structural constraints, and network constraints. Resource constraints may limit the consumption of drive and duty time per day and per block. Pick-ups and deliveries may be required to fall within time windows, which are resource intervals. An resource-dependent precedence constraint may be that a rest period is required once the daily duty time limit has been reached. A rest period, which has a min and max duration, may reset daily drive time and duty time allowances. To avoid duplicate loads within routes, elementary paths may be used as a path structural constraint, such that all loads covered by a path are pairwise different. The transportation network 110 can be described as a directed graph G=(N, E) with nodes N and arcs E. Block start and block end may define source and sink nodes of the graph. Graph (may be a time-space network, where every node in N models a particular transportation request (e.g., a load) that is to be completed at a particular point in time. An arc generally spans empty transit time to pick-up, potential wait times, hook time, loaded transit time, and drop time. Assuming that node v models completed load i, then the cost d(u, v) of the arc between nodes u and v may be calculated by subtracting the value V from the product of arc duration and hourly rate HR:

$$d(u,v) := (\text{empty transit time to pick up+wait time+ hook time+loaded transit time+drop time}) \times \text{HR} - V_i \qquad (6)$$

In some embodiments, a reduced cost of each column may be computed. The reduced cost of a column is the amount by which the optimal objective function value of the RRMP would change if the column would be part of the basis. The reduced cost of a column may be defined as:

$$\sigma_{r,b} = C_{r,b} - \sum_{i \in I_{r,b}} \pi_i - \lambda_b \qquad (6)$$

Instead of modeling the MP explicitly by exhaustively enumerating all possible columns, the idea of column generation may include the implicit modeling of the MP by iteratively adding the columns with the most negative reduced cost. For every block, the RCESPP may be solved with modified arc cost:

$$d'(u,v) := d(u,v) - \pi_v \qquad (7)$$

The sub-problem may be solved using a shortest path algorithm presented in which the workloads of identifying the cost is distributed across computing threads to generate routes that tend to be non-conflicting.

At 208, a determination may be made as to whether any more columns with negative reduced cost can be found or a maximum iteration count limit (e.g., five iterations, six iterations, etc.) has been reached. If more columns with negative reduced cost can be found and/or the maximum iteration count limit has not been reached, the method 200 may return to 204 and repeat the operations discussed at 206 and 208 any suitable number of times until the determination at 208 is that no more columns with negative reduced cost can be found or the maximum iteration count limit has been reached, the method 200 may proceed to 210.

At 210, the Restricted Master Problem (RMP) discussed above may be solved using equations 1-4 presented above. In some embodiments, $C_{r,b}$ may be replaced with $V_i$ f r represents a dummy column, which only covers load i, and 0 otherwise. The external fulfillment cost may be minimized.

At 212, duplicate loads may be identified and removed from the solution. This may not impact the objective function value but may convert the load cover into a load partition.

At 214, a local search may be executed. Executing a local search may include executing a mixed integer-linear programming (MIP) solver (Express, Cplex, Gurobi, a hybrid iterated local search heuristic with variable neighborhood descent (ILS-VND), etc.) against the set of remaining candidate columns. The MIP solver may be configured to select a combination of columns that minimizes the objective function (1).

At 216, a set of candidate columns (e.g., a candidate column pool) may be provided as output.

FIG. 3 illustrates an example candidate column pool 300, according to at least one embodiment of the present disclosure. Candidate column pool 300 may be generated by the plan generation module 132 of FIG. 1 utilizing, for example, a column generation algorithm (e.g., method 200 of FIG. 2) such as the one discussed above in connection with FIG. 2. Candidate column pool 300 may include any suitable number of columns.

A column may include any suitable number of legs (e.g., 1, 2, 3, 6, 7, etc.). A leg may in turn correspond to movement of a particular load. Each column may be generated and associated with a particular block. In some embodiments, any suitable number of columns may be generated as candidates for a particular block. By way of example, columns 254, 213, and 444 may each be generated as a candidate column for block "B1". "B1" may refer to an identifier associated with a particular block of a set of predefined blocks.

As depicted in FIG. 3, column 254 is associated with three legs. Each leg of the candidate column pool 300 may be associated with corresponding metadata (e.g., leg metadata). The metadata of a leg may include any suitable metadata corresponding to a load and/or a status of the given leg. Load metadata may include any suitable combination of an origin (e.g., a source node of the transportation network 110 of FIG. 1), a destination (e.g., a destination node of the transportation network 110), a start time and end time corresponding to a time window during which the load is to be transported and delivered, a type of load (e.g., an empty load indicating an empty container, a loaded load indicating a non-empty container, etc.), or any suitable information related to transporting a load from one node to another. In some embodiments, the status of a leg may be indicated by any suitable value or label. By way of example, a leg status may indicate the leg is plannable (e.g., modifiable) or locked (e.g., not modifiable).

The candidate column pool 300 may be generated based at least in part on the operations discussed at 202-2165 of FIG. 2.

FIG. 4 illustrates an example route plan 400, according to at least one embodiment of the present disclosure. In some embodiments, route plan 400 may be generated by the plan generation module 132 of FIG. 1 based at least in part on solving the master problem discussed above in connection with FIG. 2 utilizing, for example, the candidate column pool 300 of FIG. 3.

Route plan 400 may include any suitable number of entries corresponding to any suitable number of respective blocks. A block may be associated with any suitable metadata describing attributes of the block. By way of example, a block may be associated with a block identifier (e.g., an alphanumeric identifier with which the block is uniquely identifiable), a start time (e.g., a time at which the block starts), an end time (e.g., a time at which the block ends), a start location (e.g., a location at which the block starts), an end location (e.g., a location at which the block ends), a block state, a loaded drive time (e.g., a total amount of time during which a load is being transported), one or more constraints (e.g., indicating a number and/or duration of rest breaks, a number of rules or regulations, a number of driver-related constraints, etc.), or the like. In some embodiments, a block state may be one of a predefined set of states. By way of example, a block state may include "plannable" (e.g., indicating all of the legs of the column assigned to the block are modifiable), "tendered plannable" (e.g., indicating that the tour/column instructions have been already transmitted to a respective transportation provider, but the legs of the column may be changed in accordance with a predefined set of restrictions), "in-progress" (e.g., indicating a column that has at least one associated leg that is locked/not modifiable), "tendered final" (e.g., indicating that all legs of the column associated with the block are locked and cannot be changed), or the like.

In some embodiments, the plan generation module 132 may be configured to associate each leg of each column of candidate column pool 300 to a default value (e.g., plannable). The plan generation module 132 may also be configured to default each block state of route plan 400 to a default value (e.g., plannable).

As depicted in FIG. 4, route plan 400 may identify a column assigned to each block. By way of example, column "123" is depicted in FIG. 4 as being assigned to block "B5". As another example, column 444 of FIG. 3 may be assigned as depicted in FIG. 4 to block "B1". It should be appreciated that column 444 may be selected by the plan generation module 132 from among columns 254, 213, and 444 based at least in part on solving the master problem discussed above. In some embodiments, column 444 may be selected as the optimal column for block "B1."

FIG. 5 illustrates a block diagram and flow 500 illustrating operations performed by an optimization module (e.g., the optimization module 134 of FIG. 1), according to at least one embodiment of the present disclosure. In some embodiments, the optimization module 500 is an example of the optimization module 134 of FIG. 1. In some embodiments, the optimization module 134 may be configured to track the status of various legs and blocks over time.

In some embodiments, the optimization module 134 is configured to obtain and/or receive any suitable combination of input 502 (e.g., an existing route plan), input 504 (e.g., an existing candidate column pool), and input 506 (e.g., a time). Input 502 may be an example of the route plan 400 of FIG. 4 generated by the plan generation module 132 of FIG. 1. Input 504 may an example of the candidate column pool 300 of FIG. 3 generated by the plan generation module 132 of FIG. 1. Input 506, a time (referred to herein as a "tick time"), may be used as a filtering mechanism to filter out from re-optimization consideration legs associated with start times that occur before the tick time. In some embodiments, the time may be computed rather than received. As a non-limiting example, the tick time may be set to a current time or another time calculated from a current time (e.g., 2 hours past a current time). All column legs with a start time (or another suitable time such as a check-in time) may be locked or otherwise made unmodifiable. All remaining column legs may be considered plannable and available for re-optimization.

In some embodiments, the set of loads has potentially changed since the previous optimization session performed by the plan generation module 132 of FIG. 1. At 508, plan repair operations can be executed. Executing plan repair operations may include generating an updated existing route plan 510. In some embodiments, updated existing route plan 510 may be generated based at least in part on identifying and removing cancelled loads from the existing route plan (e.g., input 502).

Figure 6:
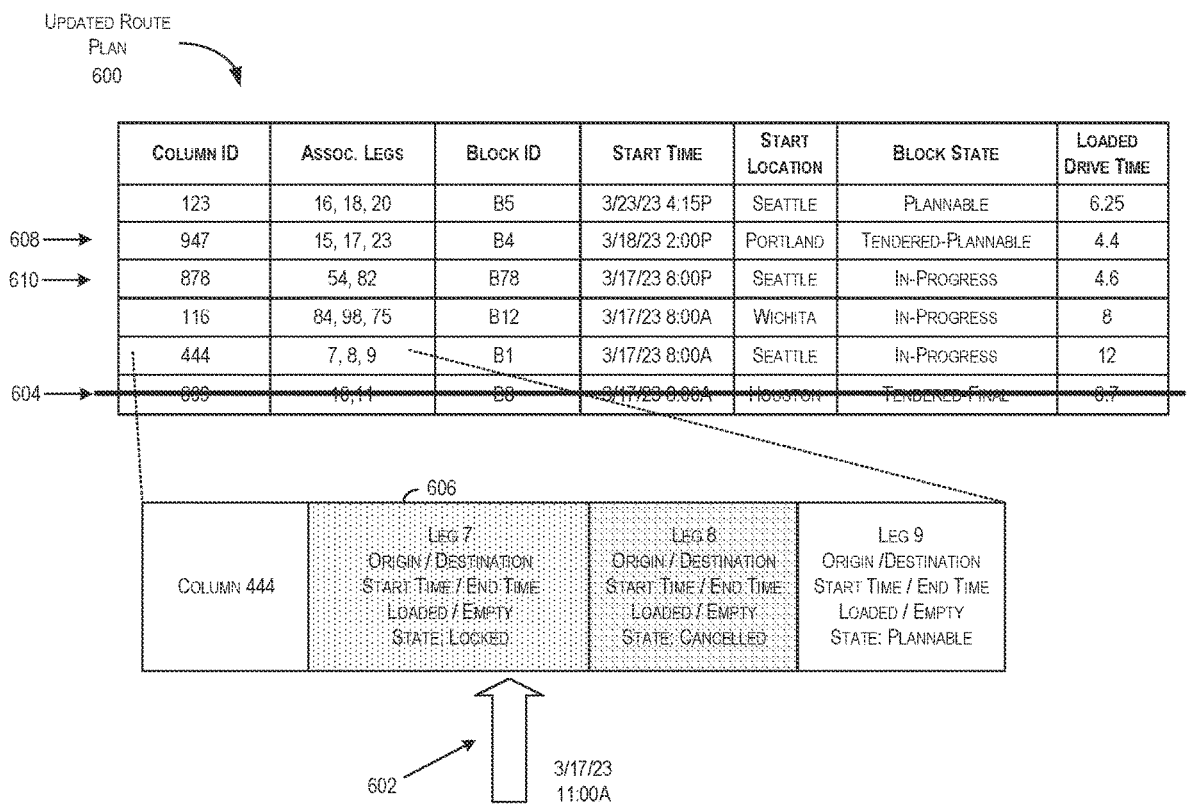
FIG. 6 illustrates an example updated route plan, according to at least one embodiment of the present disclosure.

FIG. 6 illustrates an example updated route plan 600, according to at least one embodiment of the present disclosure. Updated route plan 600 (also referred to as a "filtered route plan") may be an example of the route plan 400 of FIG. 4 as updated by the optimization module 134 of FIG. 1 as described in connection with FIG. 5. According to the operations discussed at 508 of FIG. 5, the optimization module 134 may identify any suitable number of legs of any suitable number of columns of the route plan 400 of FIG. 4 (e.g., an initial route plan generated by the plan generation module 132, a previously modified route plan modified earlier by the optimization module 134, input 502 of FIG. 5, etc.). By way of example, leg metadata corresponding to leg 8 of column 444 may be associated with data indicating the load corresponding to leg 8 has been canceled. In some embodiments, in response to identifying that the leg 8 has been canceled, the optimization module 134 may update (e.g., within updated candidate column pool 700, within a separate data structure storing metadata corresponding to leg 8, etc.) a state of leg 8 to a value (e.g., canceled) indicating the leg has been canceled. In some embodiments, the leg may be removed (or at least not added) from a set of legs available for re-optimization efforts. In some embodiments, the optimization module 134 may remove the leg 8, or otherwise disassociated it from, the column 444. As a non-limiting example, column metadata may be stored as a data structure that includes any suitable information for the column (e.g., a column identifier, one or more identifiers corresponding to one or more data structures corresponding to respective legs that are associated with the column, any suitable leg metadata corresponding to one or more respective legs associated with the column, a block identifier, etc.). An entry of a route plan (e.g., route plan 400 of FIG. 4, updated route plan 600 of FIG. 6, etc.) may include any suitable combination of column metadata, leg metadata, and block metadata corresponding to a tour (e.g., a column and corresponding legs assigned to a particular block). Column metadata, leg metadata, and block metadata may be stored in separate data structures and referenced within an entry of a route plan, or any suitable combination of the column metadata, leg metadata, and block metadata may be stored as part of the entry of the route plan as depicted in FIG. 6.

Returning to FIG. 5, the operations performed above with respect to 508 may be executed prior to the operations performed at 512, in parallel with the operations performed at 512, or subsequent to the operations performed at 512.

At 512, the optimization module 134 may process input 504 (e.g., the candidate column pool 300, a preexisting candidate column pool generated by plan generation module 132 (or by a previous execution of the optimization module 134) to ensure compatibility with the updated requirements. Tours in the existing candidate column pool may be first repaired by removing cancelled loads.

FIG. 7 illustrates an example updated candidate column pool 700, according to at least one embodiment of the present disclosure. Updated candidate column pool 700 may be an example of the candidate column pool 300 of FIG. 3 as updated by the optimization module 134 of FIG. 1 as described in connection with FIG. 5. According to the operations discussed at 514 of FIG. 5, the optimization module 134 may identify any suitable number of legs of any suitable number of columns of the candidate column pool 300 of FIG. 3 (e.g., an initial candidate column pool generated by the plan generation module 132, a previously modified candidate column pool generated earlier by the optimization module 134, input 504 of FIG. 5, etc.). By way of example, leg metadata corresponding to leg 8 of column 444 may be associated with data indicating the load corresponding to leg 8 has been canceled. In some embodiments, in response to identifying that the leg 8 has been canceled, the optimization module 134 may update a state of leg 8 (e.g., within updated candidate column pool 700, within a separate data structure storing metadata corresponding to leg 8, etc.) to a value (e.g., canceled) indicating the leg has been canceled. In some embodiments, the leg may be removed from a set of legs available for re-optimization efforts.

Returning, to FIG. 5, updated route plan 516 (an example of the existing route plan (e.g., route plan 400 of FIG. 4) after the canceled legs were removed) and the filtered candidate column pool (candidate column pool 300 of FIG. 3 after the canceled legs were removed from the existing route plan) may be processed at 514 for additional filtering. At 514, a number of filtering operations may be performed to generate and/or modify the updated route plan 600 based at least in part on the candidate column pool 400. based at least in part on the tick time, a number of locked legs of the existing route plan may be identified. For example, legs included in the existing route plan with start times occurring before the tick time may be associated with a leg status of "locked." This may cause those legs to be removed/filtered from re-optimization consideration. Loads corresponding to locked legs may be removed from a set of loads available for re-optimization consideration. This ensures that these loads (legs) remain assigned to their current block.

Updated route plan 600 of FIG. 6 depicts an example of a locked leg. As a non-limiting example, a tick time of Mar. 17, 2023, 11:00 AM may be utilized as depicted at 602. In some embodiments, leg metadata corresponding to any suitable leg associated with any suitable entry of the route plan 400 of FIG. 4 may be analyzed to identify legs with a start time that is at or earlier than the tick time. By way of example, leg 7 of column 444 may be identified as having a start time that occurs earlier than the tick time (e.g., Mar. 17, 2023, 8:00 AM). Accordingly, the optimization module 134 of FIG. 1 may be configured to set the state of the leg to a value (e.g., "locked") indicating the leg is not to be modified. By doing so, leg 7 may not be considered as part of the re-optimization considerations discussed in connection with FIG. 5.

As part of the filtering process conducted at 514, columns for which all legs in the column are associated with a locked status may be updated by the optimization module 134 with a block status of "tendered final" to indicate that those entries of the route plan cannot be modified. In some embodiments, the tours (block/column pairs, an entry of the route plan 400 such as entry 404) with a block status of "tendered final" may be temporarily removed (as shown in entry 604 of FIG. 6) from the existing route plan (e.g., input 502) and stored separately to remove those tours from being considered for re-optimization. These tours may be later merged back into the updated route plan, once generated, as discussed below.

Any tours with a block status of "tendered plannable" (e.g., the entry 608) may be considered by the optimization module 134 for re-optimization. In some embodiments, re-optimization or "tendered plannable" tours may have a predefined set of constraints imposed on any re-optimization efforts. In some embodiments, the optimization module 134 may record the current tour start time (e.g., the start time of the first leg of the column assigned to the block), the start location (e.g., the start location corresponding to the block and/or the first leg), and the loaded drive time (e.g., a value, calculated by the optimization module 134 or another module, that quantifies a total drive time during which a load is to be transported during the tour), of each currently assigned tour of the existing route plan.

If the block status for a tour is "in-progress," as depicted in entry 610, further constraints may be imposed. By way of example, the optimization module 134 may ensure that the column considered for that block must include legs that match the locked legs of the currently assigned tour. The existing route plan is used by the optimization module 134 to ensure that the optimal solution to be determined is no worse than that of the existing route plan.

Returning to FIG. 5, as part of the filtering process conducted at 514, all columns corresponding to tendered final blocks of the existing route plan 510 may be removed (at least temporarily) and stored in a separate memory location. The filtering operations performed at 514 may generate and/or modify the updated candidate column pool 518 (e.g., an example of the updated candidate column pool 700) based at least in part on the candidate column pool 400. For columns of the previous candidate column pool that correspond with tendered plannable blocks, the optimization module 134 may retain only columns that satisfy the start time, start location, and loaded drive time target constraints. By way of example, columns that do not adhere to the following constraints may be discarded and/or temporarily removed from the updated candidate column pool 700 of FIG. 7.

1) Once a tour is tendered (e.g., instructions are sent to the corresponding transportation provider to effectuate transport of the corresponding loads), a start location of the tour (e.g., a start location associated with the column, a start location corresponding to the first leg of the column, etc.) must remain the same.
2) Once a tour is tendered, the start time must not change during re-optimization to earlier than the current start time (e.g., the start time originally associated with the column).
3) In-progress tours must maintain the same locked legs (e.g., empty and/or loaded legs)
4) When changing a tendered tour, the loaded drive time of the tour must be improved by at least a predefined parameter (e.g., 10% improvement) to ensure there is sufficient benefit for making a modification and to ensure a consistent user experience (e.g., driver experience).

Based at least in part on at least some of these constraints, for tendered plannable blocks that are in-progress, the optimization module 134 may remove other columns of the candidate column pool that do not start with same sequence of locked legs as the currently assigned column for that block.

As a non-limiting example, in the situation in which column 444 is associated with an in-progress tour as depicted in FIG. 6, the optimization module 134 may remove other columns generated for the same block (e.g., block "B1") that do not share the same locked legs as column 444. Thus, column 213 may be discarded or otherwise ignored for re-optimization consideration as it includes leg 5 in lieu of leg 7, and thus, does not share the same locked legs as column 444.

In some embodiments, all columns corresponding to tendered final blocks (e.g., entry 604 of FIG. 6) are removed from consideration. By way of example, column 609 may be removed from consideration based at least in part on being associated with a tendered final block. For any tendered plannable blocks, only columns that satisfy the start time, start location, and LDT target constraints listed above may be considered for re-optimization. For tendered plannable blocks that are in-progress, corresponding columns that do not start with same sequence of locked legs as the currently assigned tour for that block. If a locked load appears in a candidate column corresponding to a different block than the block that the load is locked in, then it may be removed from the column.

Updated existing route plan 516 is an example of the updated route plan 600 of FIG. 6 after execution of the operations discussed at 508 and 514. Updated candidate column pool 518 is an example of the updated candidate column pool 700 of FIG. 7 after execution of the operations discussed at 508 and 514. In the example depicted in FIG. 7, column 254 or a portion of column 254 (e.g., legs 3 and 4) may be considered for re-optimization considerations with respect to column 444 due to the metadata of column 254 and/or the legs associated with column 254 meet the criteria listed above.

At any suitable time, a number of ad-hoc loads may be identified and added to a set of loads (e.g., legs) that are to be utilized for re-optimization. An ad-hoc load may refer to a load/leg that did not exist and/or was not considered when the previous route plan and/or column pool were generated. The set of legs (e.g., legs that are modifiable in light of the constraints provided above, ad-hoc legs, etc.) may be utilized in subsequent column generation operations.

After being processed at 514, the columns and updated route plan 516 are provided as input to a column generation algorithm to execute a column generation process at 520. The column generation algorithm utilized may be similar to that of the algorithm discussed above in connection with FIG. 2. By way of example, the relaxed master problem may first generate dual prices that are used in the operations performed to solve the sub-problem. Execution of these operations cause the generation of additional columns which may be added to the updated candidate column pool 514. The optimization module 134 may execute these operations to generate tours (e.g., columns for a respective block) for tendered plannable and plannable blocks while respecting the start time and location constraints for tendered plannable blocks. In particular, for in-progress blocks, the optimization module 134 may keep the locked part of the tour unchanged and resume a shortest path algorithm from the last locked load, while taking into account the remaining available resources (drive time, duty time) at that point.

After each iteration of column generation concludes, columns that violate the predefined constraints for tendered plannable blocks may be filtered out of the candidate column pool. For tendered-plannable and in-progress tours, the optimization module 134 may follow any suitable combination of constraints such as: 1) once a tour is tendered, the start location of a candidate column tour must be the same, if it is not, the candidate column may not be included in the updated existing route plan, 2) once a tour is tendered, the start time of the tour may not be changed to earlier than the current start time of the tour as provided in input 502, 3) in-progress tours must maintain the same locked legs, including empty and loaded drive segments, and 4) when changing a tendered tour, the savings (e.g., a reduction in LDT from the preexisting route plan) may be required to be improved by at least in a threshold amount (e.g., a 10% improvement, a 5% improvement, etc.). Any legs and/or columns may not be changed if this threshold is not met.

For in-progress blocks, the optimization module 134 may keep the locked portions of the column unchanged and resume the shortest path algorithm from the last locked load, while taking into account the remaining available resources (drive time, duty time) at that point. After each iteration of column generation concludes, any columns that violate the LDT constraint for tendered plannable blocks may be discarded. The process of solving the relaxed master problem and running the pricing problem discussed in connection with FIG. 2 may be executed anew. The candidate column pool resulting from executing the column generation process (e.g., updated candidate column pool 518, an example of the updated candidate column pool 700 of FIG. 7) may be provided as input and utilized to optimize block assignments of the updated route plan (e.g., update route plan 510, an example of the updated route plan 600 of FIG. 6).

At 522, the updated route plan 516 and the columns generated by the column generation process at 520 (e.g., updated column candidate column pool 518) may be provided and operations may be performed to optimize the block assignments of the updated route plan 516. By way of example, the master problem discussed above in connection with FIG. 2 may be solved anew. Executing the master problem reconstructs and/or modifies the updated route plan 516 utilizing the updated column pool 518. The updated route plan 516 is used to warm start the optimization module 134 that solves the master problem. The resulting solution is post-processed at 524 to remove duplicate loads from all but one tour/column. The solver prioritizes assigning a load to the same tour as in the existing route plan. This avoids unnecessary swaps of loads between tours. Finally, the updated route plan 516, as optimized at 522, and the updated candidate column pool 518 are returned and saved in storage for future use.

Figure 8:
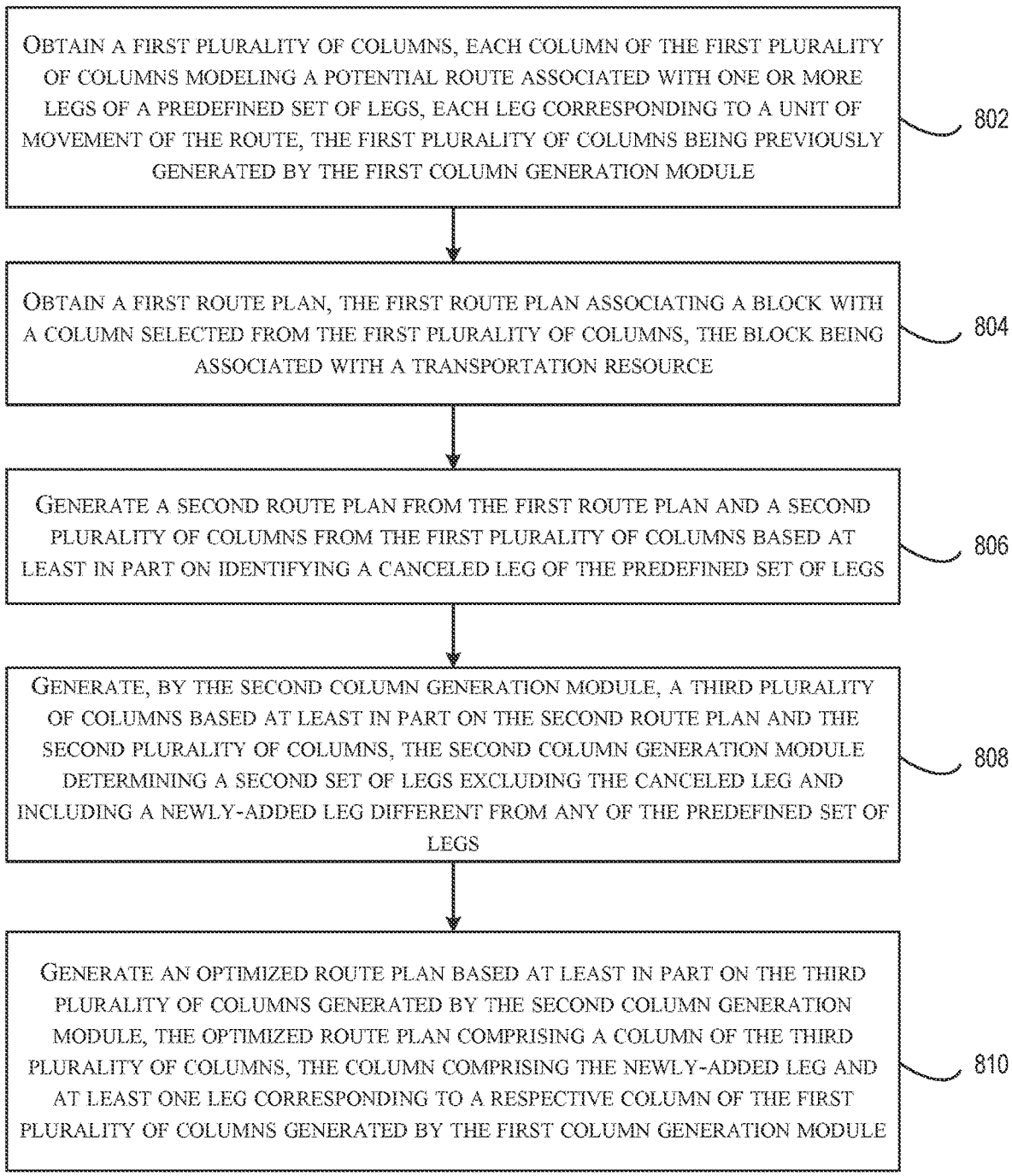
FIG. 8 illustrates an example of a flow for generating an optimized route plan, according to at least one embodiment of the present disclosure.

FIG. 8 illustrates an example of a flow for generating an optimized route plan, according to at least one embodiment of the present disclosure. The optimization to generate the transportation plan may be performed at a global scale with multiple source nodes and/or destination nodes. Operations of the flow can be performed by a management system, such as the management system 130 of FIG. 1 (e.g., by the optimization module 134 of FIG. 1). Some or all of the instructions for performing the operations can be implemented as hardware circuitry and/or stored as computer-readable instructions on a non-transitory computer-readable medium of the computer system. As implemented, the instructions represent modules that include circuitry or code executable by processor(s) of the computer system. The use of such instructions configures the computer system to perform the specific operations described herein. Each circuitry or code in combination with the relevant processor(s) represent a means for performing a respective operation(s). While the operations are illustrated in a particular order, it should be understood that no particular order is necessary and that one or more operations may be omitted, skipped, performed in parallel, and/or reordered.

In an example, the flow includes operation 802, where a first plurality of columns may be obtained. In some embodiments, each column of the first plurality of columns may model a potential route associated with one or more legs of a predefined set of legs. In some embodiments, each leg corresponds to a unit of movement of the potential route. In some embodiments, the first plurality of columns (e.g., the candidate column pool 300 of FIG. 3) may be previously generated by the first column generation module (e.g., the plan generation module 132 of FIG. 1).

In an example, the flow includes operation 804, where a first route plan (e.g., route plan 400 of FIG. 4, input 502 of FIG. 5) may be obtained. The first route plan may include a block with a column selected from the first plurality of columns. In some embodiments, the block may be associated with a transportation resource (e.g., a driver, a vehicle, etc.). In some embodiments, the transportation resource may be associated with any suitable metadata (e.g., driver data identifying a shift of a predefined duration).

In an example, the flow includes operation 806, where a second route plan (e.g., updated route plan 516 of FIG. 5, updated route plan 600 of FIG. 6, etc.) may be generated. In some embodiments, the second route plan is generated from the first route plan based at least in part on identifying a canceled leg of the predefined set of legs. Likewise, a second plurality of columns may be generated from the first plurality of columns based at least in part on identifying a canceled leg of the predefined set of legs. In some embodiments, the second column generation module determines a second set of legs excluding the canceled leg and including a newly-added leg different from any of the predefined set of legs.

In an example, the flow includes operation 808, where a third plurality of columns may be generated (e.g., by the second column generation module such as optimization module 134 of FIG. 1) based at least in part on the second route plan and the second plurality of columns.

In an example, the flow includes operation 810, where an optimized route plan may be generated based at least in part on the third plurality of columns generated by the second column generation module. In some embodiments, the optimized route plan comprises a particular column of the third plurality of columns. In some cases, the particular column comprises the newly-added leg and at least one leg corresponding to a respective column of the first plurality of columns generated by the first column generation module.

Subsequent to generating the optimized route plan (also referred to as a transportation plan or a resource plan), any suitable operations may be executed to effectuate the various load transports in accordance with the optimized route plan.

Figure 9:
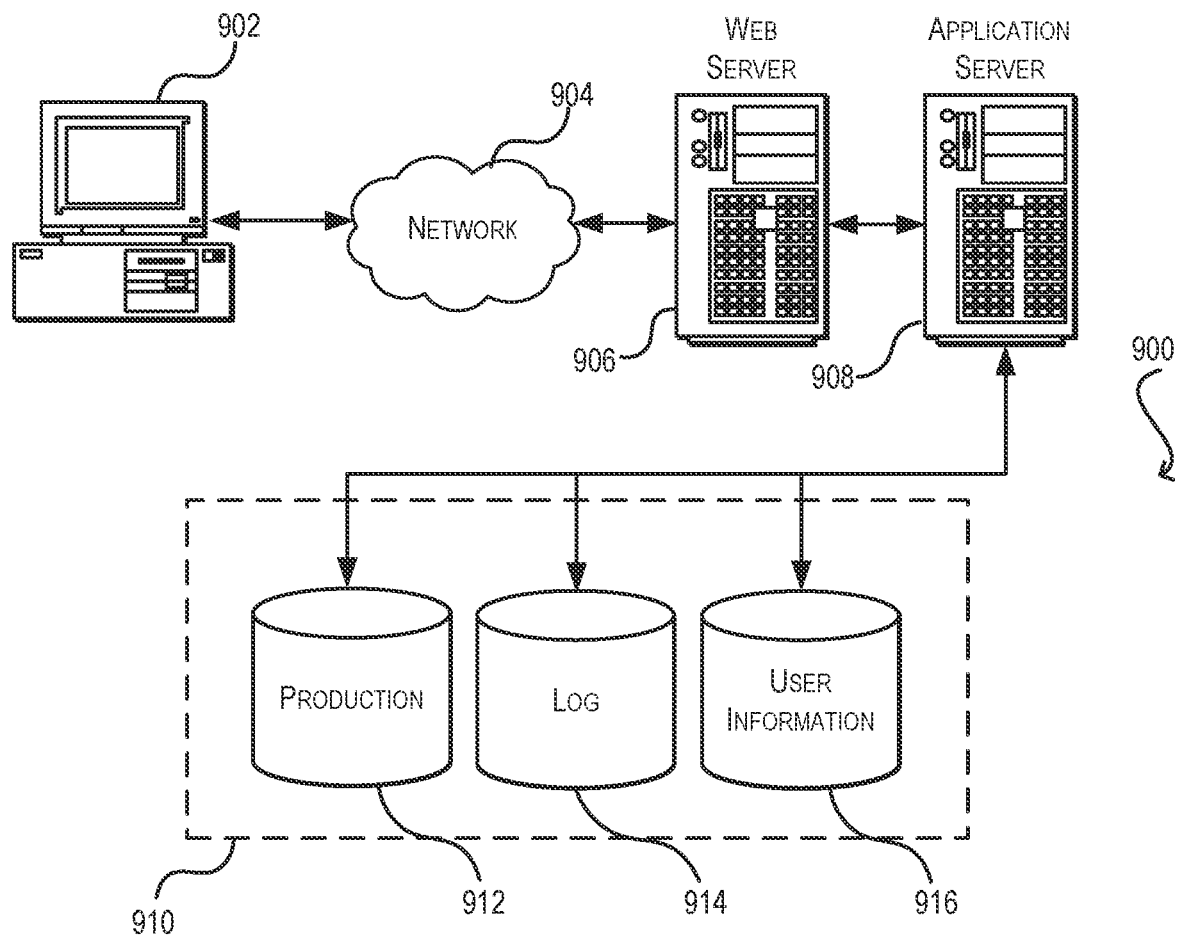
FIG. 9 illustrates an environment in which various embodiments can be implemented.

FIG. 9 illustrates aspects of an example environment 900 for implementing aspects in accordance with various embodiments. As will be appreciated, although a Web-based environment is used for purposes of explanation, different environments may be used, as appropriate, to implement various embodiments. The environment includes an electronic client device 902, which can include any appropriate device operable to send and receive requests, messages, or information over an appropriate network 904 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 902 and the application server 908, can be handled by the Web server. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log data 914, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   obtaining, by a computing device, a candidate column pool, each candidate column of the candidate column pool modeling a route associated with one or more legs of a set of legs, each leg being associated with a start time, an origin location, and a destination location, and the candidate column pool being previously generated by a first column generation module utilizing the set of legs as input;
   obtaining an existing route plan, the existing route plan associating a plurality of blocks with a subset of columns selected from the candidate column pool, a block of the plurality of blocks being associated with a block start time, a block end time, and a block state;
   identifying one or more canceled legs and one or more locked legs of the set of legs;
   generating a filtered route plan and a filtered candidate column pool based at least in part on at least one of the one or more canceled legs and the one or more locked legs;

generating a candidate set of legs based at least in part on identifying a newly-added leg, the candidate set of legs comprising the newly-added leg and at least one leg identified from the set of legs, and the candidate set of legs excluding the one or more locked legs and the one or more canceled legs;

generating an updated candidate column pool based at least in part on providing the filtered route plan, the filtered candidate column pool, and the candidate set of legs as input to a second column generation module;

generating an optimized route plan based at least in part on the updated candidate column pool and the plurality of blocks, the optimized route plan including at least one block and corresponding column of the existing route plan is unchanged in the optimized route plan; and instructing one or more resources of a network according to the optimized route plan.

2. The computer-implemented method of claim 1, wherein execution of the existing route plan is in progress, and wherein the block state indicates that 1) metadata of a column associated with a given block has been transmitted, or 2) execution of the route is currently in progress.

3. The computer-implemented method of claim 1, wherein generating the filtered candidate column pool further comprises:
  removing the one or more canceled legs from the candidate column pool;
  removing one or more candidate columns from the candidate column pool based 4 at least in part on the one or more locked legs identified.

4. The computer-implemented method of claim 1, wherein generating the filtered candidate column pool further comprises:
  identifying a respective block state corresponding to a particular block of the plurality of blocks; and
  removing one or more legs corresponding to the particular block from the candidate column pool based at least in part on the respective block state.

5. The computer-implemented method of claim 1, wherein generating the filtered candidate column pool further comprises:
  calculating a first drive time score for a particular block based at least in part on the existing route plan;
  calculating a second drive time score for a particular candidate column of the candidate column pool; and
  removing the candidate column from the candidate column pool based at least in part on a difference between the first drive time score and the second drive time score.

6. The computer-implemented method of claim 5, wherein removing the candidate column from the candidate column pool is further based at least in part on identifying that the difference between the first drive time score and the second drive time score fails to exceed a predefined threshold.

7. The computer-implemented method of claim 1, wherein the updated candidate column pool comprises a new column corresponding to a particular candidate column of the candidate column pool, the new column identifying a first leg of the candidate column and a second leg that differs from any leg previously associated with the candidate column.

8. A computing device comprising:
  a first column generation module;
  a second column generation module;
  one or more processors; and
  one or more memories storing computer-executable instructions that, when executed by the one or more processors, cause the computing device to:
    obtain a first plurality of columns, each column of the first plurality of columns modeling a potential route associated with one or more legs of a predefined set of legs, each leg corresponding to a unit of movement of the potential route, and the first plurality of columns being previously generated by the first column generation module;
    obtain a first route plan, the first route plan associating a block with a column selected from the first plurality of columns, the block being associated with a transportation resource;
    generate a second route plan from the first route plan and a second plurality of columns from the first plurality of columns based at least in part on identifying a canceled leg of the predefined set of legs;
    generate, by the second column generation module, a third plurality of columns based at least in part on the second route plan and the second plurality of columns, the second column generation module determining a second set of legs excluding the canceled leg and including a newly-added leg different from any of the predefined set of legs; and
    generate an optimized route plan based at least in part on the third plurality of columns generated by the second column generation module, the optimized route plan comprising a particular column of the third plurality of columns, and the particular column comprising the newly-added leg and at least one leg corresponding to a respective column of the first plurality of columns generated by the first column generation module.

9. The computing device of claim 8, wherein the first column generation module utilizes a first column generation algorithm to generate the first plurality of columns, the first column generation algorithm being configured to generate the first plurality of columns, the first plurality of columns being generated irrespective of any previous-existing route plan or previously-existing candidate columns.

10. The computing device of claim 8, wherein the block is associated with a block state, wherein generating the second route plan from the first route plan further comprises removing one or more entries of the first route plan based at least in part on the block state, wherein generating the second plurality of columns from the first plurality of columns further comprises removing a set of one or more columns associated with the block from the first plurality of columns based at least in part on the block state.

11. The computing device of claim 8, wherein executing the instructions further causes the computing device to, iteratively:
  determine new sets of legs that exclude newly-canceled legs and include recently-added legs;
  generate new columns using the new sets of legs, and
  generate newly-optimized route plans from the new columns generated.

12. The computing device of claim 8, wherein the first plurality of columns comprises two or more columns associated with the block, and wherein the first route plan comprises a single column associated with the block.

13. The computing device of claim 8, wherein executing the computer-executable instructions further cause the computing device to remove, from the third plurality of columns, a newly-generated column associated with a first metric that fails to exceed a threshold with respect to a second metric associated with one of the columns from the first plurality of columns.

14. A computer-readable storage medium storing computer-executable instructions that, when executed by one or more processors of a computing device, cause the computing device to:
- obtain a first column pool, each column of the first column pool modeling a route associated with one or more legs selected from a predefined set of legs, and the first column pool being previously generated by a first column generation module of the computing device;
- obtain a first resource plan, the first resource plan associating a block with a column selected from the first column pool, and the block being associated with a shift of a predefined duration;
- generate a second resource plan from the first resource plan and a second column pool from the first column pool based at least in part on identifying a restricted leg corresponding to a set of restriction criteria;
- generate, by a second column generation module of the computing device, a third column pool based at least in part on the second resource plan and the second column pool, the third column pool including a newly-generated column comprising a first portion and a second portion, the first portion corresponding to the restricted leg, and the second portion comprising a new set of legs that differ from a set of legs associated with an unrestricted portion of a corresponding column of the second column pool;
- generate an optimized resource plan based at least in part on the third column pool generated by the second column generation module, the optimized resource plan comprising the newly-generated column; and
- execute one or more operations according to the optimized resource plan.

15. The computer-readable storage medium of claim 14, wherein the second column generation module generates the optimized resource plan faster than the first column generation module based at least in part on being configured to utilize a previously existing route plan and a previously existing column pool as input.

16. The computer-readable storage medium of claim 14, wherein the third column pool comprises at least a portion of the second column pool.

17. The computer-readable storage medium of claim 14, wherein generating the second column pool further comprises identifying, from the second resource plan, at least one column of the first column pool that is associated with a tendered status value indicating that instructions associated with the column have been sent to a resource provider, and wherein executing the computer-executable instructions causes the second column generation module to restrict modification of a corresponding start location associated with the at least one column that is associated with the tendered status value.

18. The computer-readable storage medium of claim 14, wherein generating the second column pool further comprises identifying, from the second resource plan, at least one column of the first column pool that is associated with a tendered status value indicating that instructions associated with the column have been sent to a resource provider, and wherein executing the computer-executable instructions causes the second column generation module to restrict modification of a corresponding start time associated with the at least one column that is associated with the tendered status value.

19. The computer-readable storage medium of claim 14, wherein generating the second column pool further comprises:
- identifying, from the second resource plan, at least one column of the first column pool that is associated with a status value indicating that execution of the operations corresponding to the column are currently in-progress;
- identifying, from the second column pool, a specific column comprising one or more locked legs, wherein at least one of the third column pool comprises a particular column generated to comprising the one or more locked legs of the specific column.

20. The computer-readable storage medium of claim 14, wherein executing the computer-executable instructions causes the second column generation module is configured to prevent a load being associated with more than one column.

* * * * *

UNITED STATES PATENT AND TRADEMARK OFFICE
CERTIFICATE OF CORRECTION

| | | |
|---|---|---|
| PATENT NO. | : 12,111,162 B1 | Page 1 of 1 |
| APPLICATION NO. | : 17/845439 | |
| DATED | : October 8, 2024 | |
| INVENTOR(S) | : Phillip Oliver Kriett et al. | |

It is certified that error appears in the above-identified patent and that said Letters Patent is hereby corrected as shown below:

In the Claims

Claim 3, Column 23 Line 30:
Delete: "4"

Signed and Sealed this
Fifteenth Day of July, 2025

Coke Morgan Stewart
*Acting Director of the United States Patent and Trademark Office*